United States Patent
Sayre

(10) Patent No.: US 11,387,741 B2
(45) Date of Patent: Jul. 12, 2022

(54) SUPERCONDUCTING MAGNET ENGINE

(71) Applicant: Chauncey Bigelow Sayre, Huntington Beach, CA (US)

(72) Inventor: Chauncey Bigelow Sayre, Huntington Beach, CA (US)

(73) Assignee: Allison Naito, Huntington Beach, CA (US)

( * ) Notice: Subject to any disclaimer, the term of this patent is extended or adjusted under 35 U.S.C. 154(b) by 1106 days.

(21) Appl. No.: 15/939,071

(22) Filed: Mar. 28, 2018

(65) Prior Publication Data

US 2018/0287407 A1    Oct. 4, 2018

Related U.S. Application Data

(60) Provisional application No. 62/477,909, filed on Mar. 28, 2017.

(51) Int. Cl.
   *H02M 3/335* (2006.01)
   *H02J 7/00* (2006.01)
   (Continued)

(52) U.S. Cl.
   CPC ......... *H02M 3/33573* (2021.05); *B60L 58/30* (2019.02); *H01F 6/00* (2013.01);
   (Continued)

(58) Field of Classification Search
   CPC . H02M 3/33573; H02M 7/5387; B60L 58/30; B60L 2210/10; H01F 6/00;
   (Continued)

(56) References Cited

U.S. PATENT DOCUMENTS 4,470,090 A    9/1984    Carr, Jr.
5,011,821 A    4/1991    McCullough
(Continued)

FOREIGN PATENT DOCUMENTS

CN    1050956 A    4/1991
CN    1195919 A    10/1998
(Continued)

OTHER PUBLICATIONS

International Search Report and Written Opinion in related International Application No. PCT/US2018/024969; dated Jun. 20, 2018, 10 pages.

*Primary Examiner* — Rafael O De Leon Domenech
(74) *Attorney, Agent, or Firm* — Craige Thompson; Thompson Patent Law; Timothy D. Snowden

(57) ABSTRACT

Apparatus and associated methods relate to a Meissner Engine Regulator (MER) that includes a superconducting inductive element (SCIE) supplying a secondary winding coupled to recirculate excess energy from the SCIE core to a feedback winding controlled to regulate the SCIE magnetic field strength to be substantially at or below a critical magnetic field strength ($H_C$). In an illustrative example, $H_c$ may be the maximum field strength to obtain the Meissner effect in the SCIE. In some examples, the SCIE may be wound with n-filar windings. The SCIE may further include a first primary electrically coupled to and powered by a DC-to-AC power inverter, for example. The secondary winding may operate to remove excess energy from the magnetic field in the SCIE, for example, and store it in a capacitor. The SCIE may be supercooled, with liquid nitrogen, for example, such that the MER reaches electrical efficiencies approaching 100%.

20 Claims, 11 Drawing Sheets

(51) Int. Cl.
  *H01F 6/04* (2006.01)
  *H01F 6/06* (2006.01)
  *H02M 7/5387* (2007.01)
  *H01F 6/00* (2006.01)
  *B60L 58/30* (2019.01)
  *H01F 30/04* (2006.01)
  *H01F 36/00* (2006.01)
  *H01M 8/18* (2006.01)
  *H02J 7/35* (2006.01)
  *H02J 7/14* (2006.01)
  *H01M 16/00* (2006.01)

(52) U.S. Cl.
  CPC ............... *H01F 6/04* (2013.01); *H01F 6/06* (2013.01); *H01F 30/04* (2013.01); *H01F 36/00* (2013.01); *H02J 7/0068* (2013.01); *H02M 7/5387* (2013.01); *B60L 2210/10* (2013.01); *H01M 8/18* (2013.01); *H01M 16/00* (2013.01); *H02J 7/1415* (2013.01); *H02J 7/35* (2013.01)

(58) Field of Classification Search
  CPC ... H01F 6/04; H01F 6/06; H01F 30/04; H01F 36/00; H01M 8/18; H01M 16/00; H02J 7/35; H02J 7/1415; H02J 7/0068
  See application file for complete search history.

(56) References Cited

U.S. PATENT DOCUMENTS

| | | | |
|---|---|---|---|
| 5,142,861 A * | 9/1992 | Schlicher | F03H 3/00 |
| | | | 343/896 |
| 7,283,339 B2 | 10/2007 | Tekletsakik | |
| 7,336,059 B2 | 2/2008 | Steigerwald et al. | |
| 7,388,375 B2 | 6/2008 | Haase | |
| 2001/0043450 A1 | 11/2001 | Seale et al. | |
| 2004/0057255 A1* | 3/2004 | Patrick | H02K 53/00 |
| | | | 363/15 |
| 2004/0108824 A1 | 6/2004 | Ueda et al. | |
| 2007/0108956 A1 | 5/2007 | Steigerwald et al. | |
| 2012/0104979 A1 | 5/2012 | Sayre | |
| 2012/0236611 A1* | 9/2012 | Alexandrov | H02M 7/155 |
| | | | 363/126 |

FOREIGN PATENT DOCUMENTS

| | | |
|---|---|---|
| GB | 1192911 A | 5/1970 |
| WO | 2011155976 A2 | 12/2011 |

\* cited by examiner

SUPERCONDUCTING MAGNET ENGINE

CROSS-REFERENCE TO RELATED APPLICATIONS

This application claims the benefit of U.S. Provisional Application Ser. No. 62/477,909 titled "Superconducting Magnet Engine," filed by Chauncey Bigelow Sayre on Mar. 28, 2017.

This application incorporates the entire contents of the foregoing application herein by reference.

TECHNICAL FIELD

Various embodiments relate generally to electrical efficiency increases using magnetic energy coupling achieved in a superconducting state.

BACKGROUND

The field of electronic components is wrought with non-idealities, due to the limitations of the laws of nature. For example, electronic components may not withstand temperature extremes without limitation, nor may they transmit data at speeds without limitation. The discovery of superconductivity has changed these limitations to some degree. When a superconductor is cooled to a temperature below its critical transition temperature ($T_C$), its resistance drops to substantially zero. Even some metallic alloys have been shown to be superconductive below $T_C$. In an illustrative example, a continuous ring employing a superconducting material below its $T_C$, set up with a direct current, may circulate that current, theoretically forever. In practical experiments, and due to the non-idealities of even superconductivity, scientists have extrapolated that the current may flow for 10,000 years or more. Scientists have also determined that the conductivity of a metal in a superconducting state may be increased by as much as 17 orders of magnitude when compared to the same metal at room temperature.

Superconductors have made their way into practical use in the form of higher efficiency applications, for example. Because of the lower resistances of superconductive materials, conductors made of this material cooled below $T_C$ naturally exhibit lower $I^2R$ losses. Lower losses may enable engineers to build magnetically stronger and cooler electromagnets in much smaller and lighter packages, which may benefit the design of MAGLEV trains, for example. MAGLEV trains may be made to float on the strong superconducting magnetic fields, substantially reducing friction between the trains and a railway.

SUMMARY

Apparatus and associated methods relate to a Meissner Engine Regulator (MER) that includes a superconducting inductive element (SCIE) supplying a secondary winding coupled to recirculate excess energy from the SCIE core to a feedback winding controlled to regulate the SCIE magnetic field strength to be substantially at or below a critical magnetic field strength ($H_c$). In an illustrative example, $H_c$ may be the maximum field strength to obtain the Meissner effect in the SCIE. In some examples, the SCIE may be wound with n-filar windings. The SCIE may further include a first primary electrically coupled to and powered by a DC-to-AC power inverter, for example. The secondary winding may operate to remove excess energy from the magnetic field in the SCIE, for example, and store it in a capacitor. The SCIE may be supercooled, with liquid nitrogen, for example, such that the MER reaches electrical efficiencies approaching 100%.

Superconductors may exhibit a phenomenon known at the "Meissner Effect." In its essence, the Meissner Effect states, that a magnetic field (H) may penetrate a material, until its temperature drops below TC, where the material becomes superconductive. In this state, the magnetic field is essentially expelled by the superconductive material. The effect may be broken once the magnetic field builds to exceed a critical magnetic field strength ($H_C$), at which point the magnetic field may once again penetrate the material, even though the material may be superconductive. In an illustrative example, a small magnet may be levitated over a superconductive material when cooled below TC. In this example, the magnetic fields from the magnet may be substantially expelled by the superconductor, establishing a magnetic field capable of supporting the magnet in free space above the superconductor. In some embodiments, an exemplary MER may include an SCIE, which in operation includes inductively coupled windings on a superconducting core, in a way that leverages the Meissner Effect.

Various embodiments may provide one or more advantages. For example, in some embodiments, a hydrogen-oxygen fuel cell may advantageously serve as an energy storage buffer that may efficiently remove excess energy built up in the DC Storage and/or the SCIE magnetic field. The hydrogen-oxygen fuel cell may release that stored energy to be recycled to drive the magnetic field in the SCIE to a regulated level below Hc so as to maintain the benefits of the Meissner effect in the SCIE. In operation, the recirculated energy may substantially reduce the load on the primary supply, which may thereby increase the operational time, for example, of a charged battery that is supplying the primary supply.

The details of various embodiments are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a Meissner Engine Regulator (MER) exemplary use case is briefly introduced with reference to FIG. 1. Second, with reference to FIGS. 2A-2G, the discussion turns to an exemplary block diagram, the sub-circuits detailed in multiple parts. FIG. 3 then presents a schematic diagram, detailing the internal components and functionality of the MER. Next, a demonstration diagram with further explanatory discussion of the Meissner Effect is presented with reference to FIGS. 4A-4B. Then, an exemplary Superconducting Inductive Element (SCIE) configuration is presented with reference to FIG. 5A-5E, detailing construction details. Finally, FIGS. 6-7 introduce exemplary embodiments that illustrate applications that may benefit from employment of the MER.

Figure 1:
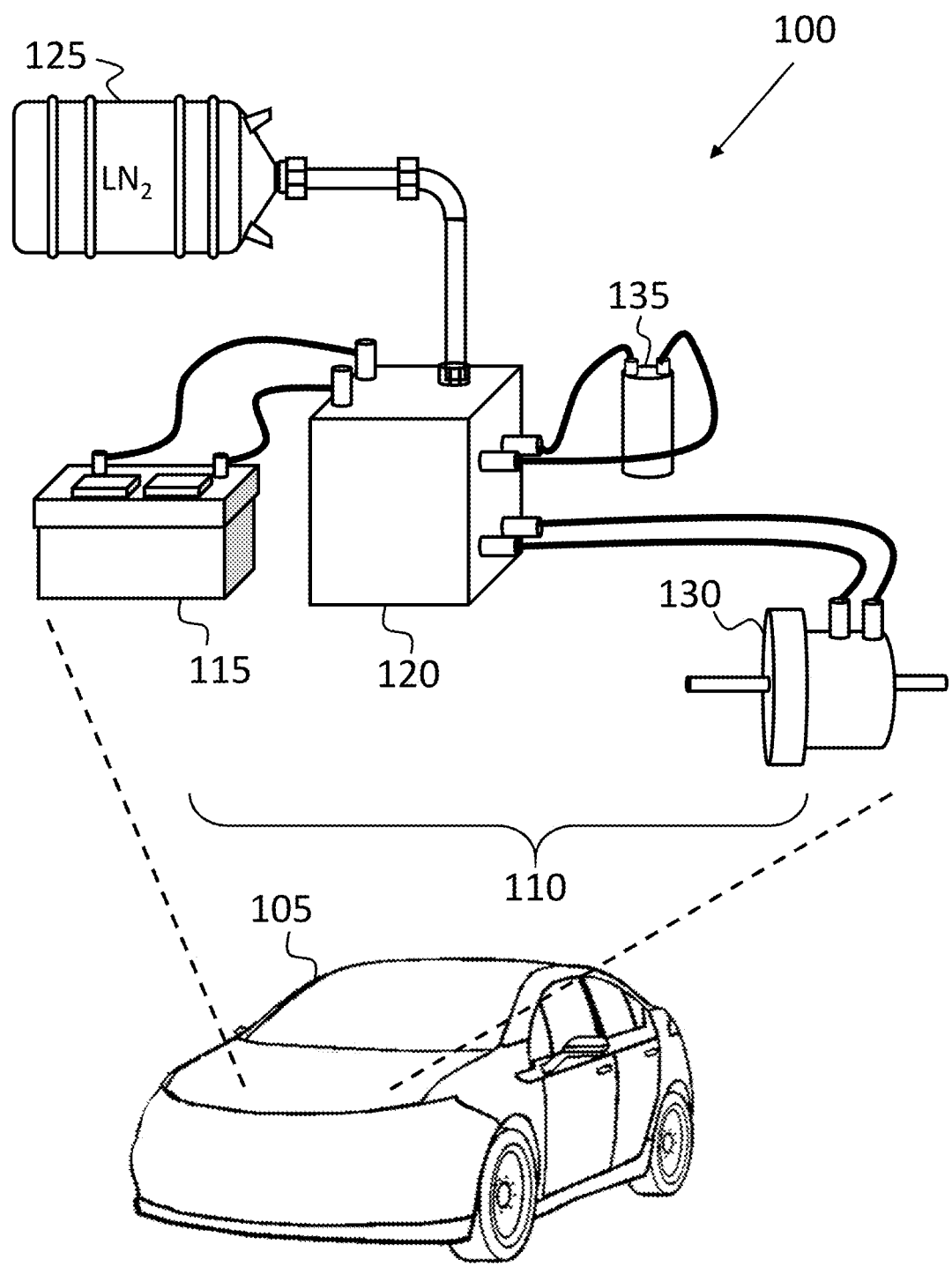
FIG. 1 depicts a perspective view of an exemplary Meissner Engine Regulator (MER) employed as an electric drive system in an electric automobile.

FIG. 1 depicts a perspective view of an exemplary MER employed as an electric drive system in an electric automobile. A use case scenario 100 depicts an electric automobile 105. Above the electric automobile 105 is a system of components shown in an exploded view illustrating the main components of a drive system 110. The drive system 110 is powered by a voltage source (e.g., battery) or a supply 115. The supply 115 connects to the input of a Meissner Engine Regulator (MER) 120. The MER 120 is coupled to receive a supply of a cooling fluid 125, for example, Liquid Nitrogen ($LN_2$). The cooling fluid 125 may supercool magnetic components within the MER 120, for example, multi-winding magnetic coupling elements such as a SCIE. The MER 120 connects to a load 130, for example, an electric motor. The MER 120 may provide a highly efficient transfer of energy from the supply 115 to the load 130 by controlling the state of operation of the MER 120 to maintain the Meissner Effect in the superconducting magnetic coupling element of the MER 120. In some examples, the MER 120 may be employed in an AC output function.

The MER 120 may generate power in excess to that provided to the load 130. The excess power is delivered to an energy storage device 135. In various examples, the energy storage device 135 may be one or more batteries.

Figure 2A:
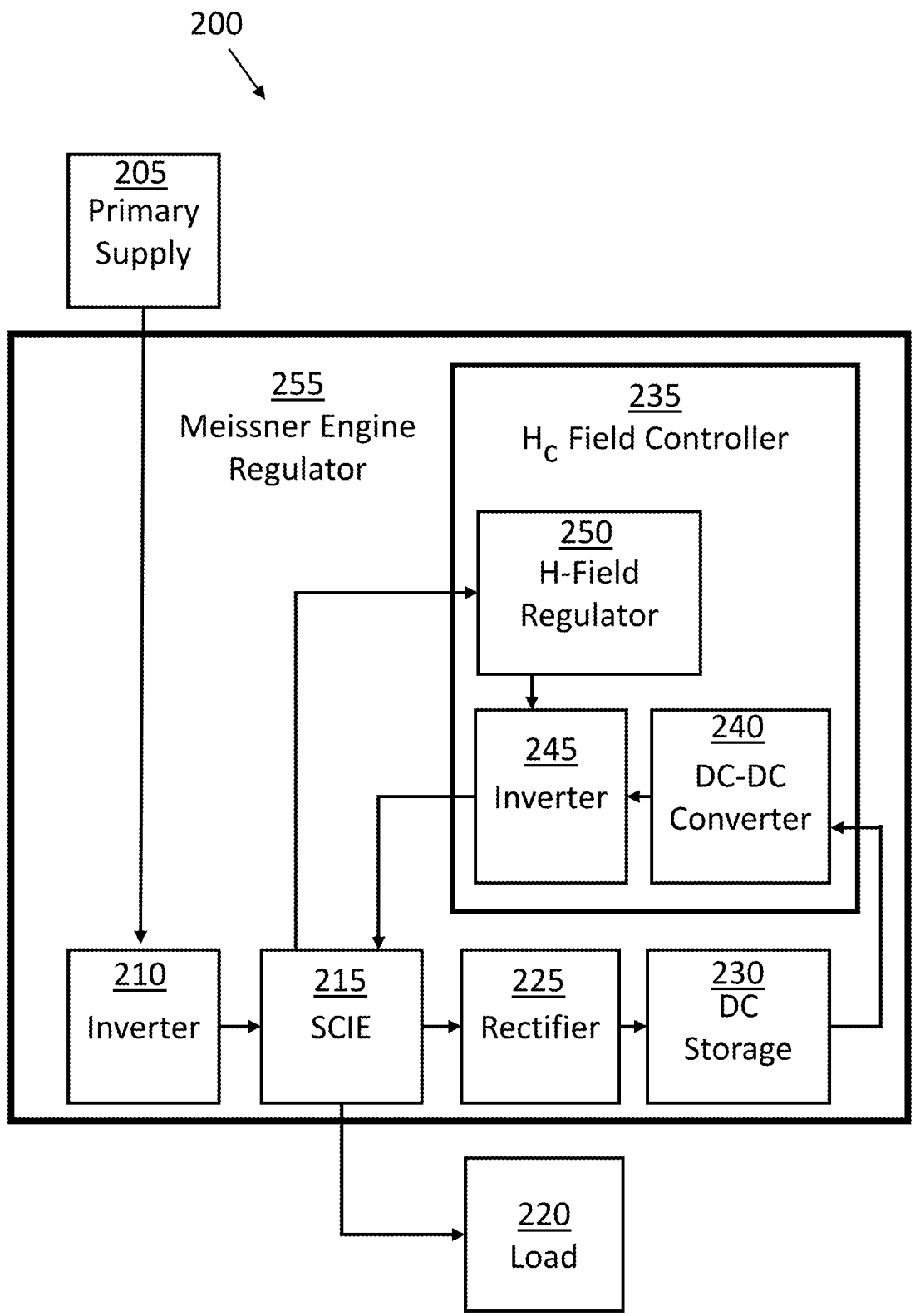
FIG. 2A depicts a block diagram of an exemplary MER system.
Figure 3:
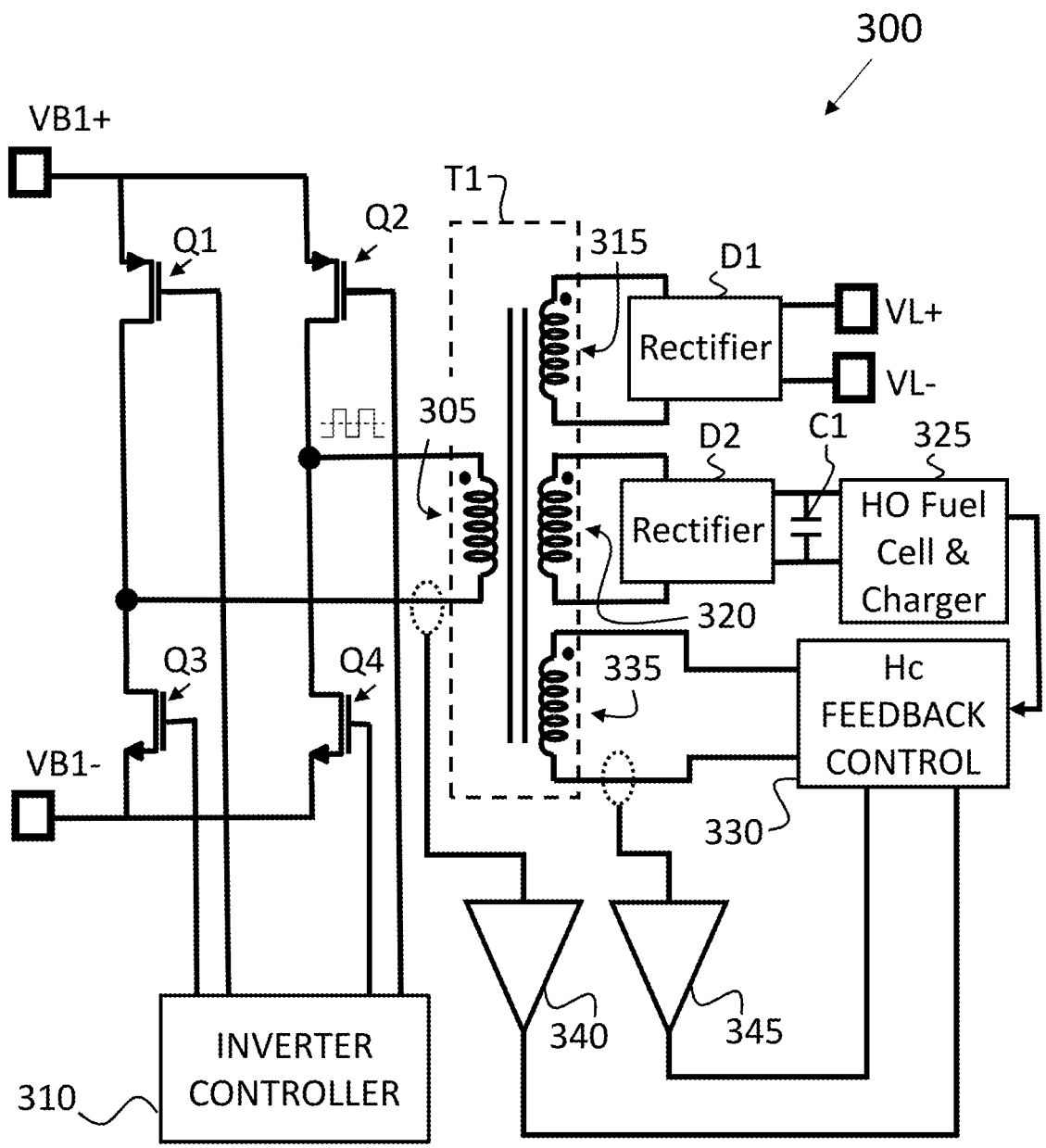
FIG. 3 depicts a schematic view of an exemplary MER.

FIG. 2A depicts a block diagram of an exemplary MER system. A system 200 includes a primary supply 205, which may be a lithium oxide battery, for example. The primary supply 205 supplies an inverter 210. The inverter 210 may convert the DC input from the primary supply 205 to an AC waveform. The inverter 210 supplies the AC waveform to a superconducting inductive element (SCIE) 215. A first secondary output of the SCIE 215 supplies a load 220. A second secondary output of the SCIE 215 supplies a critical magnetic field strength ($H_C$) field control feedback loop, beginning with a rectifier 225. In some examples, the rectifier 225 may include one or more diodes configured, for example, as an output rectifier, or a bridge. The rectifier 225 converts the AC output of the SCIE 215 to a unipolar voltage. The unipolar voltage from the rectifier 225 feeds a DC storage component 230. In some examples, the DC storage component 230 may include one or more capacitors. The DC storage component 230 feeds an $H_C$ field controller module 235. The $H_C$ field controller module 235 includes an input DC-DC converter 240. The DC-DC converter 240 then feeds an inverter 245. In some examples, the DC-DC converter 240 may be optional, such that the output of the DC storage component 230 may directly feed the inverter 245. The inverter 245 converts the DC voltage from the DC-DC converter 240 into an AC signal. The inverter 245 then feeds the AC signal back into the SCIE 215.

The $H_C$ field controller module 235 includes an H-field regulator 250, which receives feedback from the SCIE 215 in the form of voltage or current. The H-field regulator 250 measures the state of the magnetic field within the SCIE 215 using the voltages or currents from the SCIE 215. The H-field regulator 250 determines the drive amplitude to the inverter 245 to regulate the magnetic field within the SCIE 215 to a regulation point that is at or below $H_C$ in response to the measured state of the magnetic field within the SCIE 215. The H-field regulator 250 may regulate an H-field associated with a magnetic flux within an inductive element, such as SCIE 215, at or below a critical magnetic field strength (Hc).

In some embodiments, the primary supply 205 may be a battery or other DC supply. In some examples, the primary supply 205 may be an off-line DC supply.

In some embodiments, the inverters 210 and 245 may produce a 3-level output. The 3-level conversion may be accomplished by first applying positive voltage across the SCIE 215 winding, by turning on a top side switch to a top winding, and a bottom side switch to a bottom winding. Next, by applying zero voltage across the winding, by turning on both top side switches and turning off both bottom side switches. Next, by applying negative voltage across the winding, by turning on a top side switch to the bottom winding and a bottom side switch to the top winding. Finally, to complete the cycle, by applying zero voltage across the winding, by turning on both bottom side switches and turning off both top side switches.

In some embodiments, the inverters 210 and 245 may employ Pulse-Width Modulation (PWM) to simulate a sinusoidal waveform. The sinusoidal-type waveform may be accomplished by varying the pulse width at a high switching frequency using an H-Bridge. Production of the sinusoidal waveform may reduce unwanted harmonics and may lower electromagnetic interference (EMI).

In some embodiments, the SCIE 215 may be a 2-phase or 3-phase winding input. In some examples, the SCIE 215 may include very tight windings with the primary and secondary in very close-proximity, which may limit flux leakage in the windings. This tight winding arrangement may be employed in all the windings within the SCIE 215.

In some embodiments, the load 220 may include an AC-DC rectifier stage to supply DC loads. In some examples, the load 220 may accept an AC source. In some examples, the rectifier 225 may be a synchronous rectifier, which may advantageously provide higher efficiency. In some examples, the rectifier 225 may be a network of Schottky diodes, which may advantageously provide higher efficiency with less complexity.

A Meissner Engine Regulator (MER) 255 includes the inverter 210, the SCIE 215, the rectifier 225, the DC storage component 230, and the $H_C$ field controller module 235. The MER 255 receives power from the primary supply 205 and applies output power to the load 220. In various examples, the DC storage component 230 may include one or more storage components and may include control circuitry to regulate and distribute the power from the rectifier 225 to the storage component(s).

Figure 2B:
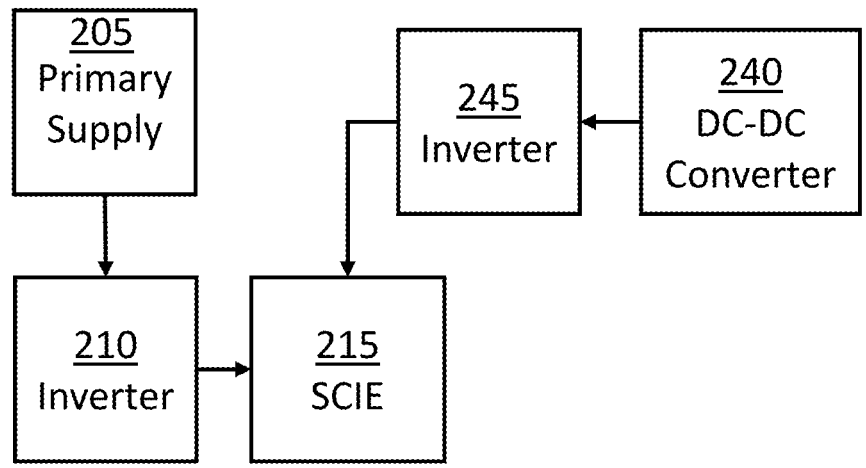
FIG. 2B depicts an inverter sub-circuit block diagram of an exemplary MER.

FIG. 2B depicts an inverter sub-circuit block diagram of an exemplary MER. The SCIE 215 is fed by two inverters 210 and 245. In some embodiments, the front ends of both inverters 210 and 245 may be H-bridge configurations. In some examples, the internal circuits of the H-bridge front end configurations within the inverters 210 and 245 may differ. The inverter 210 is fed by the primary supply 205. The inverter 245 is fed by the DC-DC converter 240.

In some the examples, where the front ends of the inverters 210 and 245 are an H-bridge configuration, where the full primary supply 205 may be applied across the entire input winding of the transformer of the inverters 210 and 245, in both polarities, forming an AC square wave. In some examples, the AC square wave may be multi-stepped. In some the examples, where the inverters 210 and 245 front end is an H-bridge configuration, the AC output peak amplitude of the inverters 210 and 245 may be substantially equivalent to the magnitude of the DC inputs from the primary supply 205.

In some embodiments, where the inverters 210 and 245 front end is a forward-mode push-pull configuration, the DC positive supply node from the primary supply 205 may be connected to a center-tap on the input winding of the transformer of the inverters 210 and 245. In some examples, the end terminals of the input winding of the transformer of the inverters 210 and 245 may be alternately switched to ground, through two switches. In some embodiments, the switches may be transistors. In some instances, the forward-mode push-pull configuration, due to the turns ratio, may naturally double the output voltage, since the switching action uses half of the input winding at a time. In some examples, the center-tap may be connected to the negative side of the primary supply 205, and the ends of the winding may be switched to the positive side of the primary supply 205.

Figure 2C:
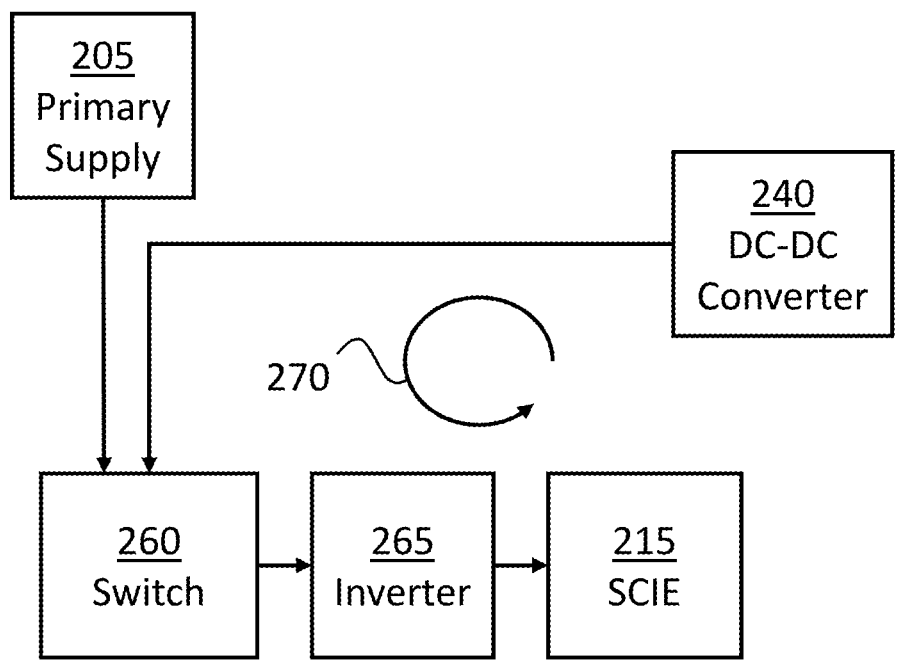
FIG. 2C depicts an inverter sub-circuit block diagram of an exemplary MER.

FIG. 2C depicts an inverter sub-circuit block diagram of an exemplary MER. The SCIE 215 is fed by a single inverter 265. The inverter 265 is fed by a multiplexor switch 260. The multiplexor switch 260 selects the supply which is to feed the inverter 265. The switch 260 selects either the primary supply 205 or the supply from the DC-DC converter 240.

In the depicted exemplary embodiment, the single inverter 265, via the multiplexer switch 260, delivers power from the primary supply 205 and/or recycled power from a recirculation path 270. In an illustrative example, the DC-DC converter 240 is routed through the switch 260, which may provide a switching network or "cathode-connected" diodes to draw from the highest voltage source. Various embodiments may be selectively controlled to draw available power from the recirculation path 270, when the recirculation supply has more than a predetermined minimum available energy (e.g., at least a predetermined minimum working voltage sufficient to drive the inverter 265 in its required operating range).

Figure 2D:
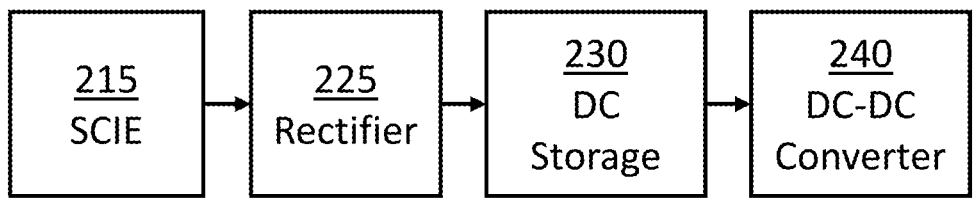
FIG. 2D depicts a rectifier sub-circuit block diagram of an exemplary MER.
Figure 2D:
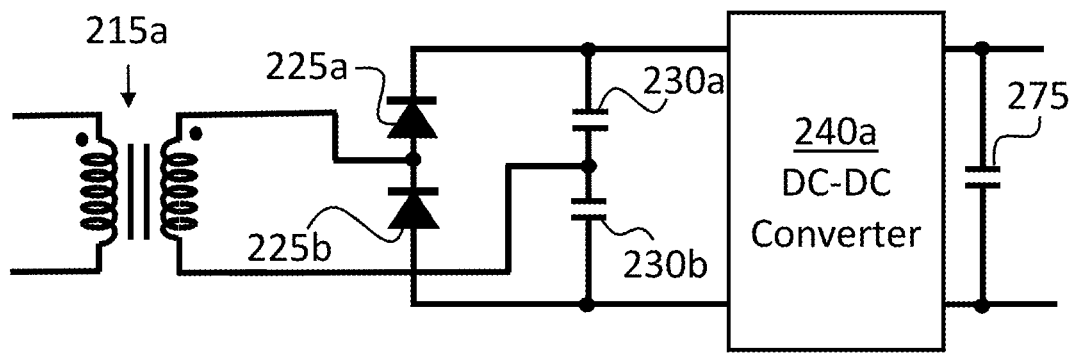

FIG. 2D depicts a rectifier sub-circuit block diagram of an exemplary MER. A sub-circuit 200d, is made up of the SCIE 215, the rectifier 225, the DC storage component 230 and the DC-DC converter 240 as implemented in FIG. 2A. An SCIE 215a is rectified by the pair of diodes 225a and 225b. The output of the diodes 225a and 225b route energy from the SCIE 215a to a pair of storage capacitors 230a and 230b. The voltage present across the series storage capacitors 230a and 230b may advantageously double the voltage magnitude across the SCIE 215a. The voltage present across the series storage capacitors 230a and 230b is then fed into a DC-DC converter 240a. The DC-DC converter 240a delivers power to a downstream load and is stabilized by an output capacitor 275.

In some embodiments, the DC-DC converter 240a is optional. The DC-DC converter 240a may be a boost converter to step up the voltage. In some examples, the DC-DC converter 240a may be a buck-boost topology, which may advantageously work with a range of input voltages, stepping up or stepping down the input voltage.

In some examples, the output voltage from the DC-DC converter 240a may be regulated. In some examples, the regulation of the DC-DC converter 240a may be to an internal regulation set point. In some examples, the regulation set point of the DC-DC converter 240a may be controlled by the $H_C$ field controller 235 (FIG. 2A), to optimize the voltage.

In some embodiments, the DC-DC converter 240a may step up the voltage before energy is delivered to a fast battery charger, for example. In some examples, the DC-DC converter 240a may deliver energy to charge a hydrogen oxygen fuel cell. In some examples, where the hydrogen oxygen fuel cell is not used, the output capacitor 275 may be used.

In some examples, the diodes 225a and 225b may be synchronous rectifiers. The synchronous rectifiers may advantageously provide higher efficiency.

Figure 2E:
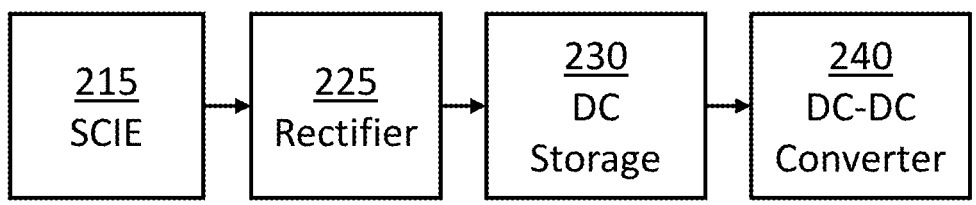
FIG. 2E depicts a rectifier sub-circuit block diagram of an exemplary MER.
Figure 2E:
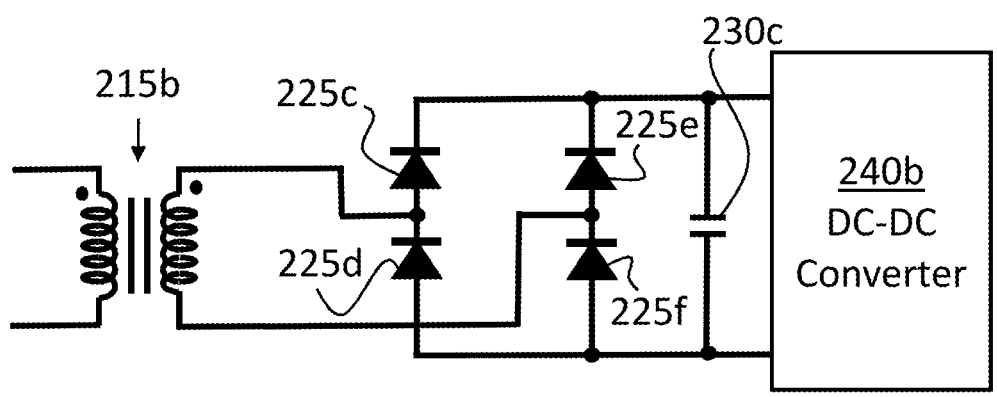

FIG. 2E depicts a rectifier sub-circuit block diagram of an exemplary MER. The sub-circuit 200e, is made up of the SCIE 215, the rectifier 225, the DC storage component 230, and the DC-DC converter 240, as implemented in FIG. 2A. An SCIE 215b is rectified by four diodes 225c and 225d, 225e, 225f in a diode bridge, full-wave rectifier configuration. The output of the diodes 225c, 225d, 225e and 225f route energy from the SCIE 215b to a storage capacitor 230c. The voltage present across the storage capacitor 230c is then fed into a DC-DC converter 240b.

Figure 2F:
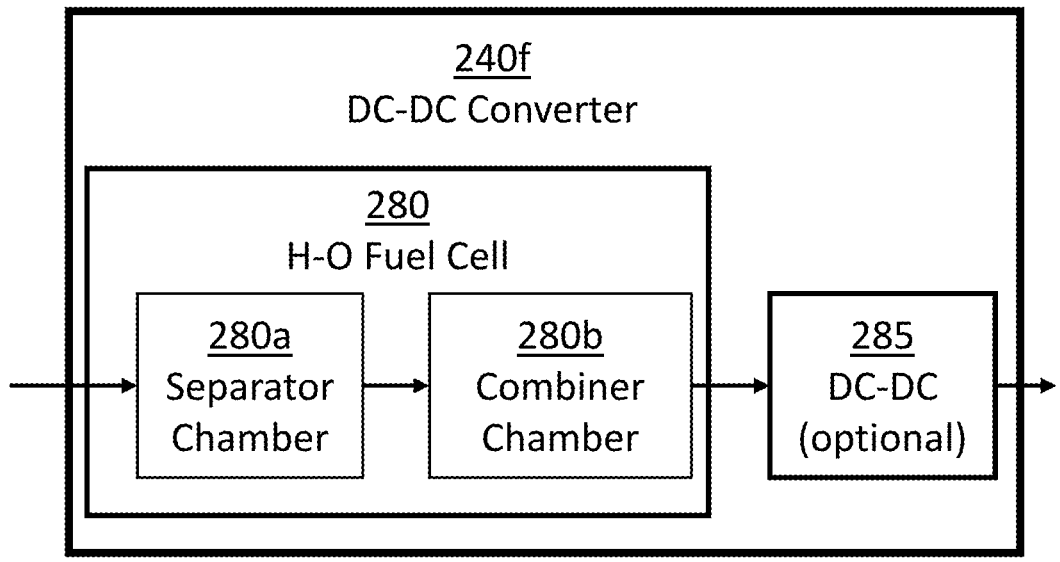
FIG. 2F depicts a DC-DC converter sub-circuit block diagram of an exemplary MER.

FIG. 2F depicts a DC-DC converter sub-circuit block diagram of an exemplary MER. A DC-DC converter 240f includes a hydrogen-oxygen fuel cell 280. The hydrogen-oxygen fuel cell 280 feeds a DC-DC converter 285. The DC-DC converter 285 feeds the output of the DC-DC converter 240f. The hydrogen-oxygen fuel cell 280 includes a separator chamber 280a and a combiner chamber 280b. The input to the hydrogen-oxygen fuel cell is the separator chamber 280a, where the input energy separates water into hydrogen and oxygen, and at least the hydrogen is stored in the separator chamber 280a, as stored energy. The separator chamber 280a couples to the combiner chamber 280b. The combiner chamber combines the collected hydrogen with oxygen to convert the stored potential energy into electrical energy. Optionally, the hydrogen-oxygen fuel cell 280 supplies the released electrical energy to the DC-DC converter 285. The DC-DC converter feeds the output of the DC-DC converter 240ƒ In some embodiments, the DC-DC converter 285 is not employed, and therefore the output of the hydrogen-oxygen fuel cell 280 provides the input and the output of the DC-DC converter 240ƒ.

In various embodiments, the hydrogen-oxygen fuel cell 280 may advantageously serve as an energy storage buffer that efficiently removes excess energy built up in the DC storage component 230 and releases that stored energy to be recycled to drive the magnetic field in the SCIE 215 to a regulated level that does not exceed $H_C$. In operation, the recirculated energy reduces the load on the primary supply 205, increasing the operational time, for example, of a charged battery that is supplying the primary supply 205.

Figure 2G:
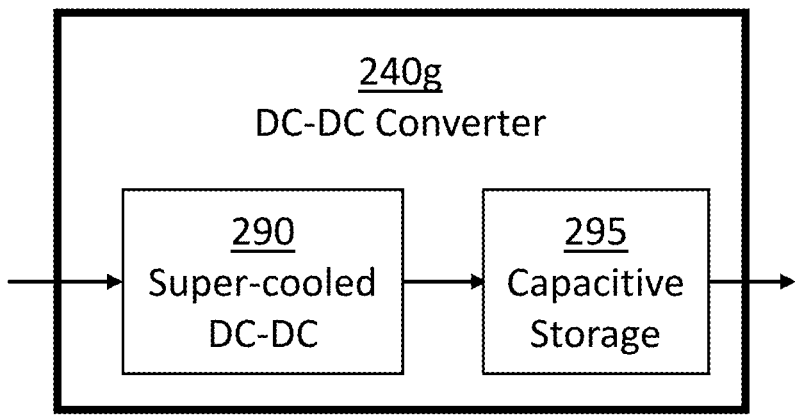
FIG. 2G depicts a DC-DC converter sub-circuit block diagram of an exemplary MER.

FIG. 2G depicts a DC-DC converter sub-circuit block diagram of an exemplary MER. In an illustrative example, the MER may leverage a supercooling chamber used to super cool an SCIE, such as SCIE 215, to super cool other components, for example a DC-DC converter 290. A DC-DC converter 240g includes the super-cooled DC-DC converter 290. In some embodiments, super cooling the DC-DC converter 290 may advantageously provide higher efficiency to the internal coupled inductor (s). The output of the super cooled DC-DC converter 290 feeds an energy storage device 295. In some examples, the energy storage device may be a capacitive energy storage device. The output of the energy storage device 295 becomes the output of the DC-DC converter 240g.

FIG. 3 depicts an electrical schematic view of an exemplary MER. In the depicted figure, an MER system 300 may be used as the MER 120 of FIG. 1. The MER system 300 includes a SCIE T1. The SCIE T1 includes four windings. The four windings are preferably wound in a quad-filar configuration. The quad-filar configuration within the SCIE T1 includes a first primary coil 305. The first primary coil 305 is driven with an AC waveform as provided by an H-bridge made up of 4 transistors Q1, Q2, Q3 and Q4. The transistors Q1, Q2, Q3 and Q4 switch the power sourced by a primary battery which connects to VB1+ and VB1−. The power switched by the transistors Q1, Q2, Q3 and Q4 is controlled in a predetermined sequential fashion by an inverter controller 310.

The SCIE T1 includes a first secondary coil 315. The first secondary coil 315 is included in the quad-filar arrangement of the SCIE T1. The first secondary coil 315 is connected to a first diode bridge D1. The first diode bridge D1 rectifies the output of the first secondary coil 315 output. The rectified output of the first secondary coil 315 from the first diode bridge D1 is fed to the loads, such as the load 130 (FIG. 1), via VL+ and VL−. In some embodiments, the loads may be a set of electric motors driving propellers, for instance in a helicopter.

The SCIE T1 includes a second secondary coil 320. The second secondary coil 320 is included in the quad-filar arrangement of the SCIE T1. The second secondary coil 320 is connected to a second diode bridge D2. The second diode bridge D2 rectifies the output of the second secondary coil 320 output. The rectified output of the second secondary coil 320 from the second diode bridge D2 is fed to a capacitor C1. The capacitor C1 in turn feeds a charger 325. The charger 325 charges a secondary battery, such as the energy storage device 135 (FIG. 1), via VB2+ and VB2−. In some embodiments, where the loads do not use up all the energy in the flux in the SCIE T1, the charger 325 may reset the core, by capturing the remaining flux in the SCIE T1 core, via the second secondary coil 320 and store the captured energy in the secondary battery via VB2+ and VB2−.

The charger 325 drives a feedback control circuit 330. The feedback control circuit 330 drives a second primary coil 335. The second primary coil 335 drives the core of the SCIE T1 with additional energy from the battery B2, such that the maximum magnetic field strength in the SCIE T1 core stays at or below the "critical" magnetic field strength ($H_C$), as dictated by the Meissner Effect. See FIG. 3 description. It is noteworthy that it may not be harmful when the SCIE's magnetic field is lower than $H_C$, but the MER may not operate at peak efficiency. If $H_C$ is exceeded, the SCIE efficiency may revert to that of a non-MER implementation.

The feedback control circuit 330 regulates the magnetic field strength within the SCIE T1 core to just below the "critical" magnetic field strength, $H_C$. Since the magnetic field strength in a core is proportional to the current in the coils feeding the core (in this case, the first primary coil 305 and the second primary coil 335), the magnetic field strength in the SCIE T1 core may be regulated by monitoring the current in the first primary coil 305 and the second primary coil 335. To accomplish this regulation, the feedback control circuit 330 receives measurements from a first primary coil current monitor 340 and the second primary coil current monitor 345. The magnetic field in the core may be the product of the primary current times the number of turns in the primary winding divided by the effective length of the core. To complete the regulation, the feedback control circuit 330 then scales the current measurements appropriately and compares the result with $H_C$, providing an error signal (current) to the second primary coil 335, in a classical closed loop feedback fashion. The feedback control circuit 330 may ensure the core flux is reset to zero before the next cycle begins. In some embodiments, the primary coils 305 and 335 may be time-division-multiplexed (TDM). The feedback control circuit 330 may regulate an H-field associated with a magnetic flux within an inductive element, such as SCIE T1, at or below a critical magnetic field strength (Hc).

In some examples, the feedback control circuit may include digital circuitry. In various examples, the feedback control circuitry may include a digital processor executing preprogrammed instruction. Feedback control circuitry including a digital processor may advantageously allow for straightforward field upgrades, for example.

In some instances, the feedback control circuit may include analog circuitry. Analog circuitry may advantageously provide continuous control resolution. Analog circuitry may be advantageously implemented space-effectively.

In some embodiments, the 4 transistors Q1, Q2, Q3 and Q4 making up the H-bridge may be Bipolar Junction Transistors (BJT), for example. Some embodiments may realize a benefit in the high current capabilities of various BJTs. In some examples, the H-bridge transistors may be Metal Oxide Silicon Field-Effect Transistors (MOSFET), for example. MOSFETs provide the benefit of being controlled by voltage instead of current and have a positive temperature co-efficient mitigating thermal runaway. Voltage control of the gates in MOSFETs may allow straight-forward gate drive control circuits. In some examples, the 4 transistors may be Insulated Gate Bipolar Transistors (IGBT), which may provide higher current capabilities with voltage control of the gate.

In some circuit examples, the inverter controller 310 may control the switching of transistors Q1, Q2, Q3 and Q4, such that the input to the first primary coil 305 may receive a substantially square wave swinging from positive battery voltage to negative battery voltage. In some examples, the switching transistors may produce a waveform similar to the square wave in the first example, except all transistors may turn off for a period between the positive and negative battery voltage swings, to produce a 3-level waveform. In some examples, the switching transistors, may be pulse-width modulated (PWM'ed) to simulate an analog voltage. In these examples, the voltage input to the first primary coil 305 may be substantially sine-wave shaped.

In an illustrative example, the inverter controller 310 may be an integrated solution, for example, a switch-mode power supply (SMPS) integrated circuit (IC). Switch mode power supply topologies for an inverter controlled by the inverter controller 310 may include, by way of example and not limitation, a push-pull, for straight-forward implementations, or a forward converter for low power and low bill of materials cost.

The first diode bridge D1 and the second diode bridge D2 may be implemented with standard rectifiers, which may lower bill of materials cost, or with Schottky rectifiers, which may allow higher efficiency and higher switching speeds, or with synchronous rectifiers, which may provide very high efficiency at a higher bill of materials cost and higher circuit board space usage.

In some embodiments, the charger 325 may be implemented as a high efficiency DC-DC converter, for example, a flyback converter. In an illustrative embodiment, the function of the charger 325 may be to take charge off the capacitor C1, charge the secondary battery, and recycle some of the secondary battery energy back into the SCIE T1 via the feedback control circuit 330 and the second primary coil 335. In some embodiments, the energy from the secondary battery may be controlled and regulated by the feedback control circuit 330 by employing pulse with modulation. Pulse-width modulation may produce a high efficiency fine resolution control of the error signal into the second primary coil 335.

In an illustrative example, the second diode bride D2 may be implemented with the bottom side of the second secondary coil 320 connected to circuit ground and the top side connected to a series diode, to charge the capacitor C1. In some embodiments, the series diode may be a Schottky diode to produce a lower forward voltage drop, advantageously increasing efficiency.

Implementation of the charger 325 as a buck converter, in some embodiments may advantageously provide a straight-forward solution, consuming less circuit board space. Buck converters may provide high efficiency in a small package.

Implementation of the charger 325 as a flyback converter, in some embodiments may advantageously provide a high efficiency charging mechanism. Flyback converters may provide a low bill of materials cost and may provide a robust solution to widely varying input voltages.

In some embodiments, the feedback control circuit 330 may measure the current in both the first primary coil 305 and the second primary coil 335. The measurements may be facilitated by an adder circuit. The sum of the 2 current measurements may be compared to value representing $H_C$ by an error amplifier. The result of the error amplifier may then control the error signal that may modulate the second primary coil 335. The modulation may be pulse-width modulation (PWM). The modulation driving the second primary coil 335 may advantageously regulate the internal SCIE magnetic field to just below the Meissner critical magnetic field strength $H_C$.

Figure 4A:
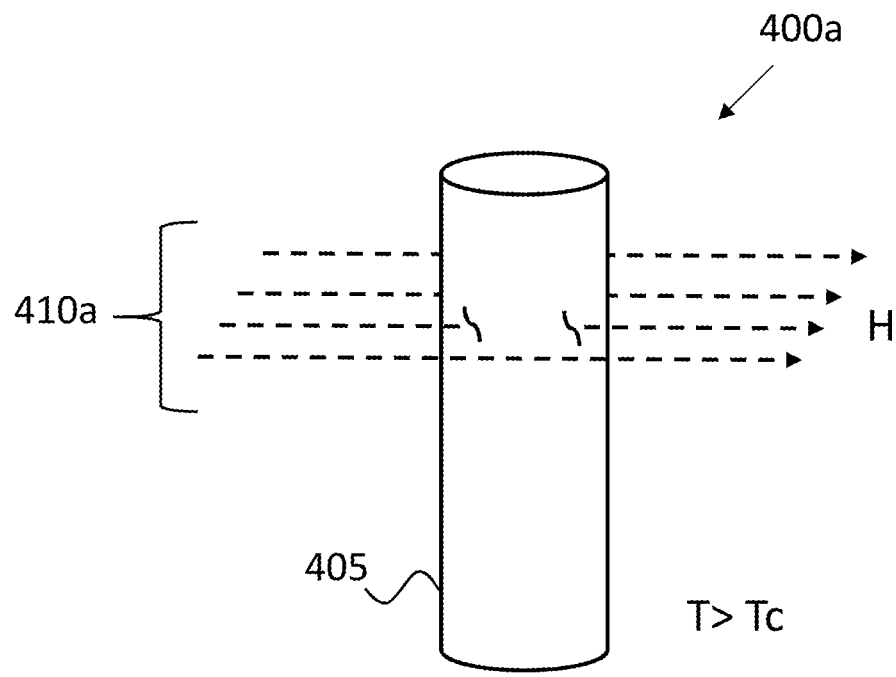
FIG. 4A depicts a perspective view of a copper wire above its critical transition temperature (Tc), exposed to a magnetic field.

FIG. 4A depicts a perspective view of a copper wire above its critical transition temperature (Tc), exposed to a magnetic field. A demonstration of the Meissner Effect 400a includes a copper wire 405 and a magnetic field 410a. The copper wire 405 that is above it's critical transition temperature $T_C$, for example, at room temperature, is penetrated by the magnetic field 410a.

Figure 4B:
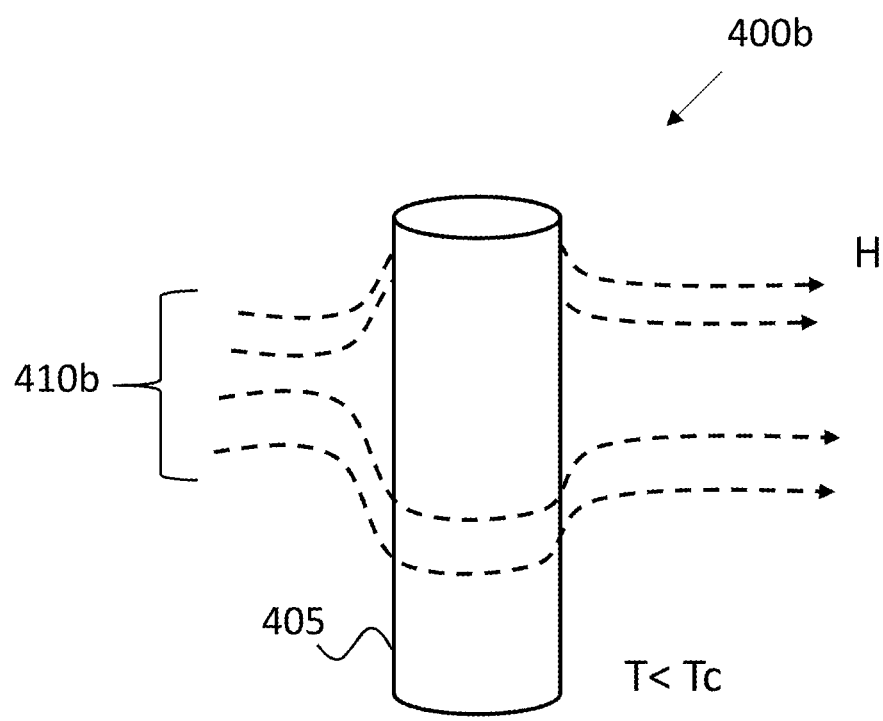
FIG. 4B depicts a perspective view of a copper wire below its critical transition temperature (Tc), exposed to a magnetic field.

FIG. 4B depicts a perspective view of a copper wire below its critical transition temperature (Tc), exposed to a magnetic field. A demonstration of the Meissner Effect 400b includes the copper wire 405 and a magnetic field 410b. The copper wire 405, when cooled below $T_C$, no longer allows the magnetic field 410b to penetrate. Instead, the magnetic field 410b is substantially expelled, because the magnetic field 410b induces electric current on the surface of the copper wire 405, which cancels out a second magnetic field contained in the copper wire 405. It is noteworthy to mention that when the copper wire 405 is exhibiting the magnetic field 410b expulsion, below $T_C$, that if the magnetic field 410b were to increase beyond a critical magnetic field strength $H_C$, the copper wire 405 may revert to a state where the magnetic field 410b may penetrate the copper wire 405 and may no longer have substantially zero resistance. In an exemplary illustration, this higher resistance state in a SCIE's windings, may not only cause more resistive losses, but a core may experience more flux leakage due to penetration of magnetic fields.

Figure 5A:
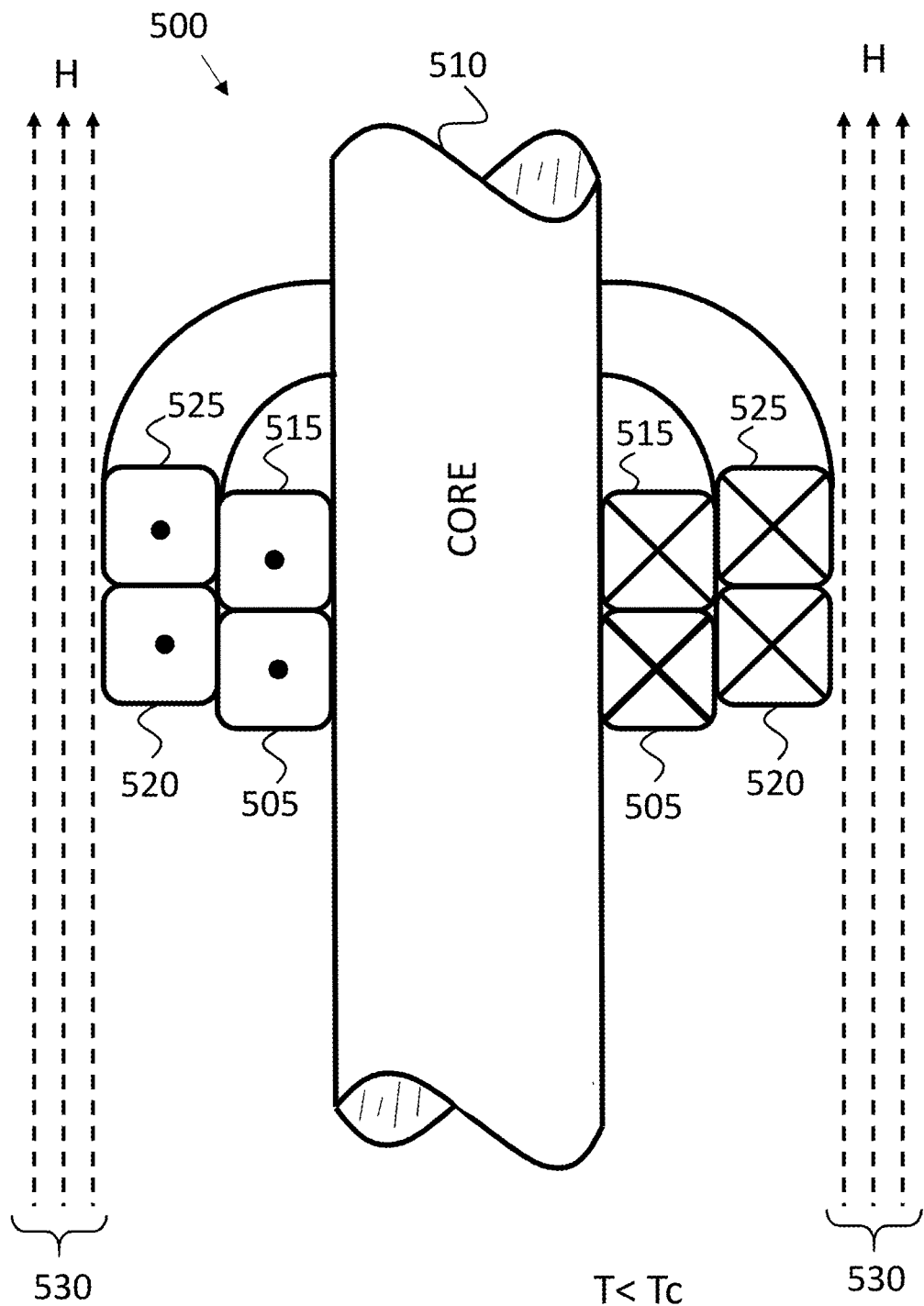
FIG. 5A depicts a perspective cross-sectional view of an exemplary MER superconducting inductive element (SCIE) below the critical transition temperature ($T_C$) for all materials shown.

FIG. 5A depicts a perspective cross-sectional view of an exemplary MER superconducting inductive element (SCIE) below the critical transition temperature ($T_C$) for all materials shown. In this exemplary embodiment, current flow is depicted into the page with an "X'" and out of the page with a dot "•" A SCIE cross section 500 includes a first primary SCIE winding 505. The first primary SCIE winding 505 is wound around a core 510 in a quad-filar manner. The core 510 includes a second primary winding 515 wound in substantially close proximity, intimately, with the first primary SCIE winding 505. The core 510 includes a first secondary winding 520 wound in substantially close proximity, intimately, with the first primary SCIE winding 505 and the second primary winding 515. Finally, the core 510 includes a second secondary winding 525 wound in substantially close proximity, intimately, with the first primary SCIE winding 505, the second primary winding 515 and the first secondary winding 520. In some examples, a thin insulative film or a very thin tape may protect the windings from shorting together. The quad-filar winding may be made up of a bundle of magnet wire including the first primary SCIE winding 505, the second primary winding 515, the first secondary winding 520, and the second secondary winding 525. As a bundle, the quad-filar group of magnet wires is wound tightly around the core 510. For clarity, only the first winding is shown. It may be understood that the core 510 may include a number of windings as dictated by a detailed SCIE design.

When the first primary SCIE winding 505 and/or the second primary winding 515 include a driving current, a magnetic field 530 is produced. In some embodiments, where the SCIE temperature is below the critical transition temperature ($T<T_C$), and where the strength of the magnetic field 530 is below $H_C$, the SCIE material becomes superconducting, and expels the magnetic field 530 forcing it to travel on the outside of the windings. This effect may provide the benefit of lower leakage. The coupling may be substantially ideal, because due to the Meissner Effect, the magnetic field 530 may not "cut through" any windings or the core 510. In some examples, the superconduction state of the SCIE wires may produce no eddy currents and may therefore contribute to the efficiency gains. In some examples, because of the Meissner Effect, there may be very little core loss, and this may contribute to near ideal magnetic coupling to transfer magneto-motive force to other windings.

In some exemplary configurations, the windings shown in FIG. 5A may be arranged differently. For example, instead of the 2×2 example depicted in FIG. 5A, there may be a manufacturing benefit to winding the quad-filar bundle in a 1×4 configuration. In some examples, winding the bundle in a different way may provide non-unity turns ratios among the windings 505, 515-525.

In some embodiments, the core 510 may be an air core. In some examples, the core 510 may be a ferrite core. In some examples, the core 510 may be an iron core. In some embodiments, the core 510 may be a powder core. In an illustrative example, the core 510 may be a ferromagnetic material with a relative permeability greater than 1.

Figure 5B:
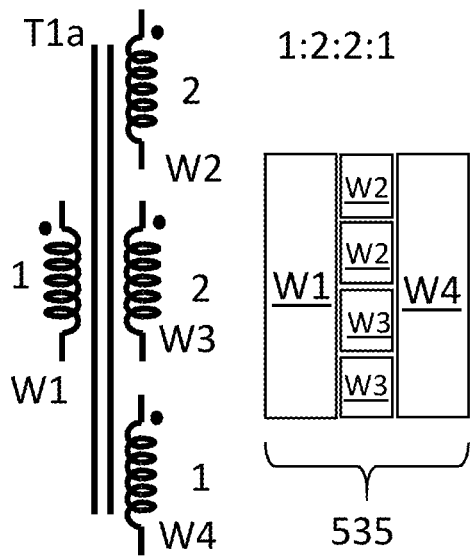
FIG. 5B depicts a cross-sectional view and corresponding schematic of the windings of an exemplary MER SCIE wound as 1:2:2:1.

FIG. 5B depicts a cross-sectional view and corresponding schematic of the windings of an exemplary MER SCIE wound as 1:2:2:1. A winding cross-section 535 is representative of a SCIE T1*a*, wound as 1:2:2:1. The SCIE T1*a* includes a primary input winding W1, a secondary load-side output winding W2, a charger winding W3 and a feedback winding W4. Turns ratios such as 1:2:2:1 may advantageously provide more efficient impedance or current capacity matching. For example, a high current, low voltage input battery may utilize a low turns-count primary, while the load may benefit from a higher voltage secondary with a higher turns-count. For example, high turns-count windings may employ smaller cross-sectional wire. The winding cross-section 535 may advantageously pack tightly to substantially reduce the amount of leakage flux making its way through the gaps between the conductors.

Figure 5C:
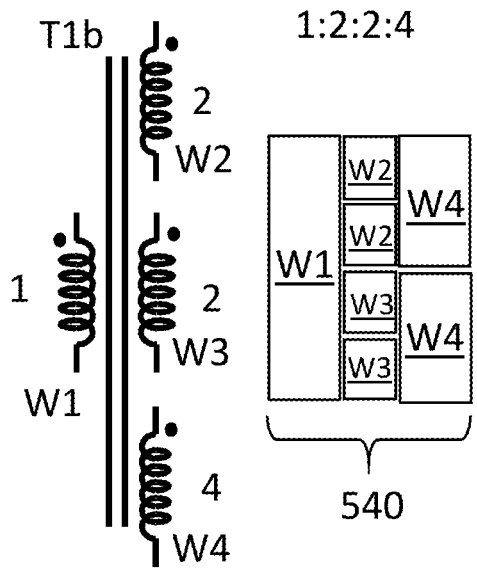
FIG. 5C depicts a cross-sectional view and corresponding schematic of the windings of an exemplary MER SCIE wound as 1:2:2:4.

FIG. 5C depicts a cross-sectional view and corresponding schematic of the windings of an exemplary MER SCIE wound as 1:2:2:4. A winding cross-section 540 is representative of a SCIE T1*b*, wound as 1:2:2:4. The SCIE T1*b* includes a primary input winding W1, a secondary load-side output winding W2, a charger winding W3 and a feedback winding W4. Turns ratios such as 1:2:2:4 may provide an additional benefit over the 1:2:2:1 turns ratio of FIG. 5B. For example, high turns-count on windings for the feedback circuit, such as the feedback winding W4, may provide higher resolution of the feedback circuit. Higher resolution of the feedback circuit may provide tighter regulation of the SCIE's T1*b* magnetic field, keeping the field substantially close to but not over $H_C$. The winding cross-section 540 may advantageously pack tightly to substantially reduce the amount of leakage flux making its way through the gaps.

Figure 5D:
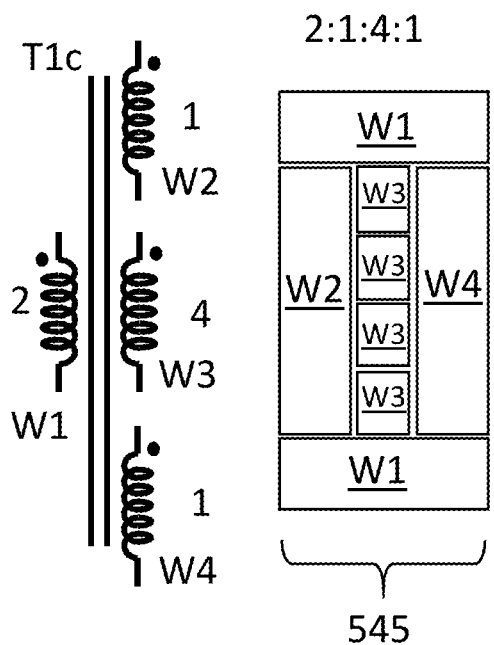
FIG. 5D depicts a cross-sectional view and corresponding schematic of the windings of an exemplary MER SCIE wound as 2:1:4:1.

FIG. 5D depicts a cross-sectional view and corresponding schematic of the windings of an exemplary MER SCIE wound as 2:1:4:1. A winding cross-section 545 is representative of a SCIE T1*c*, wound as 2:1:4:1. The SCIE T1*c* includes a primary input winding W1, a secondary load-side output winding W2, a charger winding W3 and a feedback winding W4. Turns ratios such as 2:1:4:1 may provide an additional benefit over the 1:2:2:1 turns ratio of FIG. 5B and the 1:2:2:4 turns ratio of FIG. 5C. For example, high turns-count on windings for the primary input winding W1, may provide for higher voltage batteries. For example, a high voltage, low current input battery may need a high turns-count primary, while the load may benefit from a lower voltage secondary with a lower turns-count. For example, high turns-count windings may employ smaller cross-section wire, and low turns-count windings may employ larger cross-section wire. The winding cross-section 545 may advantageously pack tightly to substantially reduce the amount of leakage flux making its way through the gaps between the conductors.

Figure 5E:
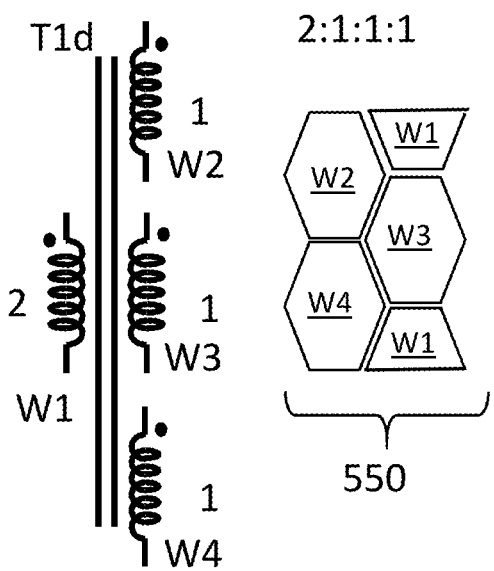
FIG. 5E depicts a cross-sectional view and corresponding schematic of the windings of an exemplary MER SCIE wound as 2:1:1:1.

FIG. 5E depicts a cross-sectional view and corresponding schematic of the windings of an exemplary MER SCIE wound as 2:1:1:1. A winding cross-section 550 is representative of a SCIE T1*d*, wound as 2:1:1:1. The SCIE T1*d* includes a primary input winding W1, a secondary load-side output winding W2, a charger winding W3 and a feedback winding W4. Turns ratios such as 2:1:1:1 may provide an additional benefit over the 2:1:4:1 turns ratio of FIG. 5D. For example, lower turns-count on windings for the charger winding W3, may provide for lower voltage charger designs. The winding cross-section 550 may advantageously pack tightly to substantially reduce the amount of leakage flux making its way through the gaps between the conductors. The winding cross-section 550 is made up of hexagonal cross-section conductors, which may advantageously reduce magnetic leakage due to the longer paths made by the hexagon shapes. In some embodiments, the windings may have a round cross section, which may advantageously reduce cost due to their substantially ubiquitous presence in the market.

The magnetic wire that makes up the winding bundle may have various cross-sectional shapes providing various benefits. For example, a hexagonal magnet wire may beneficially stack the windings of the magnet wire, such that the cross section resembles a honeycomb. The honeycomb cross section may provide benefits over a square, brick wall cross section, in that the magnetic flux may not travel in a straight line, but may travel a tortuous path, or zigzag.

The winding cross-sections 535, 540, 545 and 550 may represent multi-filar arrangements. Multi-filar arrangements may include two or more conductor strands as a group. The multi-filar arrangement may be wound around a core. The multi-filar arrangement may advantageously maintain relationships between the conductor strands as they are applied to various cores.

Figure 6:
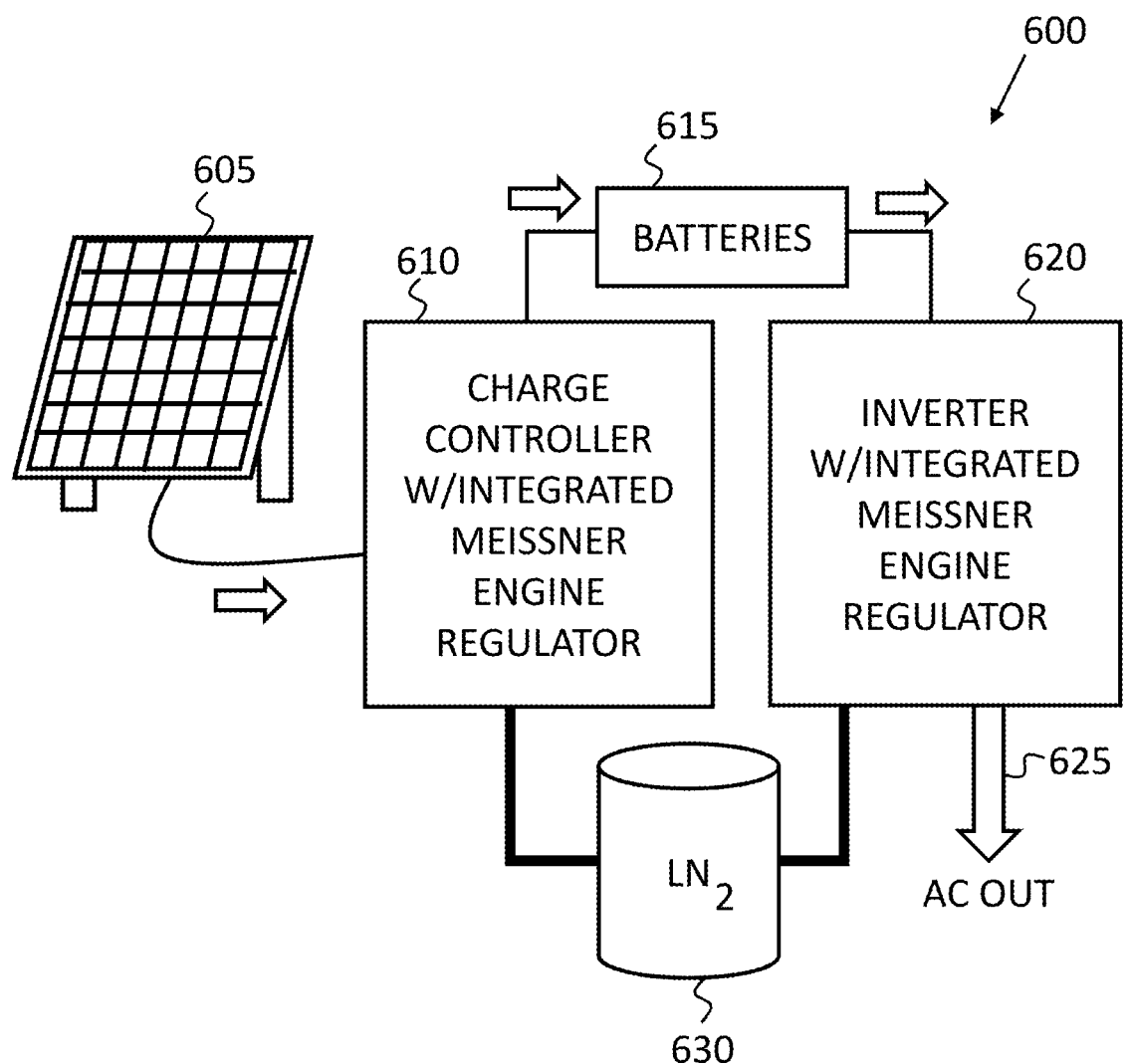
FIG. 6 depicts a schematic view of an exemplary MER used to boost efficiency in an exemplary solar power installation.

FIG. 6 depicts a schematic view of an exemplary MER used to boost efficiency in an exemplary solar power installation. An exemplary solar installation 600 includes a solar panel 605. The solar panel 605 is electrically connected to a charge controller 610. The charge controller 610 is electrically connected to a bank of batteries 615. The bank of batteries 615 is electrically connected to an inverter 620. The inverter 620 produces an AC output 625, which may supply the electrical power for a personal residence, for example. The charge controller 610 and the inverter 620 are coupled to a cryogenic cooling mechanism 630, for example, liquid nitrogen. In some examples, the charge controller 610 and the inverter 620 may each include an integrated exemplary embodiment of the MER. The charge controller 610 and the inverter 620 may integrate the MER technology, by replacement of various components within those blocks. The SCIE may be replaced by the cryogenically cooled MER SCIE, which may provide for lower resistive losses in the SCIE windings and may provide for closer magnetic coupling due to the Meissner Effect. In addition, the additional windings to provide feedback and control of the magnetic field may be implemented. The combined advantages of lower resistance and closer coupling may advantageously increase efficiency of these installations.

Figure 7:
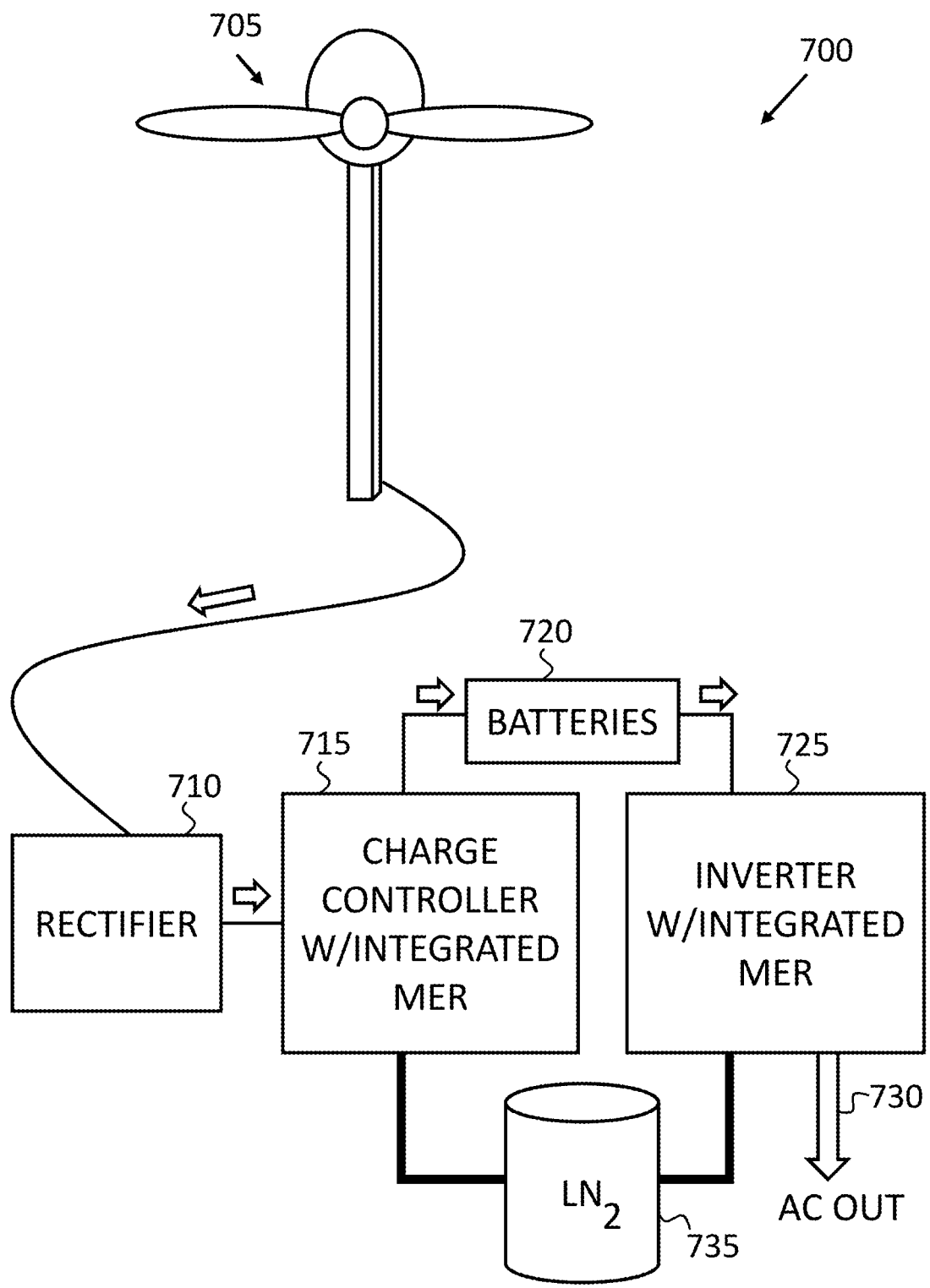
FIG. 7 depicts a schematic view of an exemplary MER used to boost efficiency in an exemplary wind power installation.

FIG. 7 depicts a schematic view of an exemplary MER used to boost efficiency in an exemplary wind power installation. An exemplary wind power installation 700 includes a wind turbine generator 705. The wind turbine generator 705 is electrically connected to a rectifier 710, which transforms an AC power output from the wind turbine generator 705 into DC. The rectifier 710 is electrically connected to a charge controller 715. The charge controller 715 is electrically connected to a bank of batteries 720. The bank of batteries 720 is electrically connected to an inverter 725. The inverter 725 produces an AC output 730, which may be used to supply an AC utility grid, for example. The charge controller 715 and the inverter 725 are coupled to a cooling mechanism 735, for example, liquid nitrogen. In some examples, the charge controller 715 and the inverter 725 may each include an integrated exemplary embodiment of the MER.

Some embodiments of power installations using the MER technology may include hydropower, tidal or geothermal, for example. In each example the core technology of the MER may provide a boost to the overall electrical efficiency of the installation, bringing it closer to 100%. In public utility installations where the power generated may be in the megawatts, even a 1% gain, may provide efficiency gains in the 10's of kilowatts.

Although various embodiments have been described with reference to the figures, other embodiments are possible. For example, some mobile battery powered applications may employ various MER embodiments to leverage more of the energy within their drive batteries. Though the transfer efficiency in a state of the art electrical drive system may be high, the MER pushes that efficiency even closer to the theoretical 100% level.

In some implementations, the MER may be integrated into a conventional Uninterruptable Power Supply (UPS), which may be known as an AC backup supply. An exemplary implementation may be at a business, where the UPS may be located in a remote out-building, which may house a utility panel, electronics and a cooling fluid. Business owners may benefit from an increased electrical efficiency, which may drive down their utility costs.

The MER may be an apparatus that includes a quad-filar wound SCIE, which may further include a first primary, electrically coupled to and powered by a DC-to-AC power inverter, a first secondary, electrically coupled to, and suppling power to, a load output, a second secondary, electrically coupled to, and suppling power to, a bleed-off charger, storing the excess energy from the SCIE core, and a feedback circuit, situated between, and electrically coupled to, the bleed-off charger and a second primary, such that the feedback circuit may provide magnetic field strength regulation within the SCIE, such that the regulation point may be substantially near, but may not exceed Hc, and such that the SCIE may be supercooled, with liquid nitrogen, for example.

In some embodiments, copper cooled by liquid nitrogen may be employed in the MER SCIE. Copper provides enough superconduction properties at 77° K (the boiling point of liquid nitrogen) to allow the efficiency benefits due to low resistance and to allow conditions to produce the Meissner Effect. The use of copper may advantageously overcome some of technical challenges of superconductivity; mainly the infrastructure to get the material to its superconducting state, and the brittle nature of superconducting materials. Trading off the extremely low resistance properties of more exotic materials cooled at much lower temperatures, for copper, gains a reasonable superconductance, malleability, and the benefits of the Meissner Effect, for a much lower cost of materials and much lower cost to maintain the cryogenics, using cost effective liquid nitrogen.

Although various embodiments have been described using copper windings, other conductive materials may form one or more of the windings of the SCIE. By way of example and not limitation, aluminum may be used, for example.

In some implementations, the MER may step up DC input voltages from the primary battery. In these implementations, the input battery may be a low voltage, high current capacity type, such as a sealed lead acid battery.

In some implementations, the MER may step down DC input voltages from the primary battery. In these implementations, the input battery may be a high voltage, low current capacity type. Low input current may advantageously allow thinner input wire, or allow longer distances between the battery and the MER input. In some examples, the lower input current may provide higher efficiency energy transfer from the primary battery, due to lower $I^2R$ losses.

In an exemplary embodiment, higher output voltages into the charger may provide a benefit to the energy storage capacity of various DC storage devices. For example, since energy storage in a capacitor is proportional to the square of the voltage, higher voltages on the capacitor may provide more energy storage.

As an illustration, an exemplary MER may be a low loss energy recycling system, which may be used on an electric drive for an electric vehicle, for example. In this example, the MER may provide an efficiency boost to the vehicle's electronic drive by, for example, substantially increasing the vehicle's range without a recharge.

In some embodiments, renewable energy power installations may, for instance, employ the MER technology, which may provide for lower resistive losses in the SCIE windings, and may provide for closer magnetic coupling due to the Meissner Effect. The combined advantages of lower resistance and closer coupling may advantageously increase efficiency of these installations, for example, when powered by a DC (e.g., battery) source.

Superconductors have made their way into practical use in the form of higher efficiency applications. Because of the lower resistances of superconductive materials, conductors made of this material, cooled below $T_C$, naturally exhibit lower $I^2R$ losses. Utility grids, for example, may benefit from these lower losses, due to the long lengths of power transmission conductors.

In some embodiments, the magnetic field in the core may be detected using a magnetic field sensor. In some examples, a microelectromechanical system (MEMS) sensor may be used. MEMS sensors rely on mechanical motion within the sensor structure, influenced by the Lorenz force to produce an output proportional to the magnetic field. In some examples, a Hall effect sensor may sense the magnetic field. The Hall effect sensor is a solid-state device.

In an exemplary aspect, a superconducting engine may include an inductive element. The inductive element may include a primary input winding operable to induce a magnetic flux in response to a primary current in the primary input winding. The inductive element may include a regulating winding configured to magnetically couple to the primary input winding via the magnetic flux. The superconducting engine may include an H-field regulator coupled to the regulating winding. The H-field regulator may be configured to supply a regulating current to the regulating winding, such that an H-field associated with the magnetic flux within the inductive element may be regulated at or below a critical magnetic field strength (Hc). The superconducting engine may include a cryogenic cooling unit coupled to the inductive element. The cryogenic cooling unit may be configured to maintain the inductive element (T1) in a superconducting state. The cryogenic cooling unit may include liquid nitrogen.

The inductive element may include an auxiliary winding which may be configured to magnetically couple via the magnetic flux to the primary input winding. The auxiliary winding may be configured to draw excess energy, which is not delivered to an output load winding, out of the inductive element, such that the H-field associated with the magnetic flux within the inductive element is regulated at or below the critical magnetic field strength (Hc). In various examples the primary input winding, the regulating winding, the auxiliary winding and the load winding may be configured in a multi-filar arrangement.

The superconducting engine may include, for example, a power management circuit which may be configured to store at least a portion of the excess energy in an energy storage device. In some examples, the energy storage device may include a hydrogen-oxygen fuel cell. In some embodiments, the H-field regulator may be coupled to the energy storage device and may be configured to receive at least a portion of the excess energy to generate the regulating current, for example.

The superconducting engine may include, for example, a first current monitor, which may produce a primary current signal indicative of the primary current in the primary input winding. The H-field regulator may be configured to supply the regulating current to the regulating winding in response to the primary current signal.

The superconducting engine may include, for example, a second current monitor, which may produce a regulating current signal indicative of the regulating current in the regulating winding. The H-field regulator may be configured to supply the regulating current to the regulating winding in response to the regulating current signal. The superconducting engine may include, for example, an H-bridge configured to drive the primary input winding.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A superconducting engine apparatus comprising:
an inductive element (T1) comprising:
a primary input winding (305) operable to induce a magnetic flux in response to a primary current in the primary input winding (305); and,
a regulating winding (335) configured to magnetically couple to the primary input winding (305) via the magnetic flux;
an H-field regulator (330) operatively coupled to the regulating winding (335), the H-field regulator (330) configured to supply a regulating current to the regulating winding (335), such that an H-field associated with the magnetic flux within the inductive element is regulated at or below a critical magnetic field strength (Hc); and,
a cryogenic cooling unit (125) coupled to the inductive element (T1) and configured to maintain the inductive element (T1) in a superconducting state.

2. The apparatus of claim 1, wherein the inductive element (T1) further comprises an auxiliary winding (320) configured to magnetically couple to the primary input winding (305) via the magnetic flux, the auxiliary winding (320) configured to draw excess energy that is not delivered to an output load winding (315) out of the inductive element (T1), such that the H-field associated with the magnetic flux within the inductive element (T1) is regulated at or below the critical magnetic field strength (Hc).

3. The apparatus of claim 2, wherein the primary input winding (305), the regulating winding (335), the auxiliary winding (320) and the load winding (315) are configured in a multi-filar arrangement.

4. The apparatus of claim 2, further comprising a power management circuit configured to store at least a portion of the excess energy in an energy storage device (230).

5. The apparatus of claim 4, wherein the energy storage device (230) comprises a hydrogen-oxygen fuel cell.

6. The apparatus of claim 4, wherein the H-field regulator (330) is operatively coupled to the energy storage device (230) and configured to receive at least a portion of the excess energy to generate the regulating current.

7. The apparatus of claim 1, further comprising a first current monitor (340) producing a primary current signal indicative of the primary current in the primary input winding (305), the H-field regulator (330) configured to supply the regulating current to the regulating winding (335) as a function of the primary current signal.

8. The apparatus of claim 1, further comprising a second current monitor (345) producing a regulating current signal indicative of the regulating current in the regulating winding (335), the H-field regulator (330) configured to supply the regulating current to the regulating winding (335) as a function of the regulating current signal.

9. The apparatus of claim 1, further comprising an H-bridge configured to drive the primary input winding (305).

10. The apparatus of claim 1, wherein the cryogenic cooling unit comprises liquid nitrogen.

11. A superconducting engine apparatus comprising:
an inductive element (T1) comprising:
a primary input winding (305) operable to induce a magnetic flux in response to a primary current in the primary input winding (305); and,
a regulating winding (335) configured to magnetically couple to the primary input winding (305) via the magnetic flux; and,
an H-field regulator (330) operatively coupled to the regulating winding (335), the H-field regulator (330) configured to supply a regulating current to the regulating winding (335), such that an H-field associated with the magnetic flux within the inductive element (T1) is regulated at or below a critical magnetic field strength (Hc).

12. The apparatus of claim 11, wherein the inductive element (T1) further comprises an auxiliary winding (320) configured to magnetically couple to the primary input winding (305) via the magnetic flux, the auxiliary winding (320) configured to draw excess energy that is not delivered to an output load winding (315), out of the inductive element (T1), such that the H-field associated with the magnetic flux within the inductive element (T1) is regulated at or below the critical magnetic field strength (Hc).

13. The apparatus of claim 12, wherein the primary input winding (305), the regulating winding (335), the auxiliary winding (320) and the load winding (315) are configured in a multi-filar arrangement.

14. The apparatus of claim 12, further comprising a power management circuit configured to store at least a portion of the excess energy in an energy storage device (230).

15. The apparatus of claim 14, wherein the H-field regulator (330) is operatively coupled to the energy storage device (230) and configured to receive at least a portion of the excess energy to generate the regulating current.

16. The apparatus of claim 11, further comprising a first current monitor (340) producing a primary current signal indicative of the primary current in the primary input winding (305), the H-field regulator (330) configured to supply the regulating current to the regulating winding (335) as a function of the primary current signal.

17. The apparatus of claim 11, further comprising a second current monitor (345) producing a regulating current signal indicative of the regulating current in the regulating winding (335), the H-field regulator (330) configured to supply the regulating current to the regulating winding (335) as a function of the regulating current signal.

18. A superconducting engine apparatus comprising:
an inductive element (T1) comprising:
  a primary input winding (305) operable to induce a magnetic flux in response to a primary current in the primary input winding (305); and,
  a regulating winding (335) configured to magnetically couple to the primary input winding (305) via the magnetic flux;
means for regulating an H-field associated with the magnetic flux within the inductive element (T1) at or below a critical magnetic field strength (Hc); and,
a cryogenic cooling unit (125) coupled to the inductive element (T1) and configured to maintain the inductive element (T1) in a superconducting state.

19. The apparatus of claim 18, wherein the inductive element (T1) further comprises an auxiliary winding (320) configured to magnetically couple to the primary input winding (305) via the magnetic flux, the auxiliary winding (320) configured to draw excess energy that is not delivered to an output load winding (315), out of the inductive element (T1).

20. The apparatus of claim 19, further comprising a power management circuit configured to store at least a portion of the excess energy in an energy storage device (230).

\* \* \* \* \*